E0152 XR 3,761,914

United States Patent
Hardy et al.

[11] 3,761,914

[45] Sept. 25, 1973

[54] ALARM SYSTEM

[75] Inventors: George F. Hardy, Huntington, L. I.; Morton E. David, New York, N.Y.

[73] Assignees: Bell Television, Inc.; Holmes Electric Protective Co., both of New York, N.Y.; part interest to each

[22] Filed: Mar. 10, 1972

[21] Appl. No.: 233,823

Related U.S. Application Data

[63] Continuation of Ser. No. 863,563, Oct. 3, 1969.

[52] U.S. Cl. .......... 340/310, 178/DIG. 13, 340/151

[51] Int. Cl. .......... H04m 11/04

[58] Field of Search .......... 340/310, 150, 151; 179/5; 178/DIG. 13

[56] References Cited

UNITED STATES PATENTS

| | | | |
|---|---|---|---|
| 3,255,306 | 6/1966 | Campbell et al. | 178/DIG. 13 |
| 3,401,234 | 9/1968 | Heald | 179/5 R |

*Primary Examiner*—John W. Caldwell

*Assistant Examiner*—Robert J. Mooney

*Attorney*—Meyer A. Gross

[57] ABSTRACT

An alarm system for use in conjunction with a community antenna television system which includes the concept of by-passing the amplifiers along the transmission lines of the community antenna television and including an arrangement for determining the existence of fire, intrusion, and other types of emergency conditions and sending back across the community antenna television system a coded signal to a receiver at the central office of the community antenna television system. There is provided a further arrangement for ascertaining at the central office whether the system is in operating condition or not.

10 Claims, 1 Drawing Figure

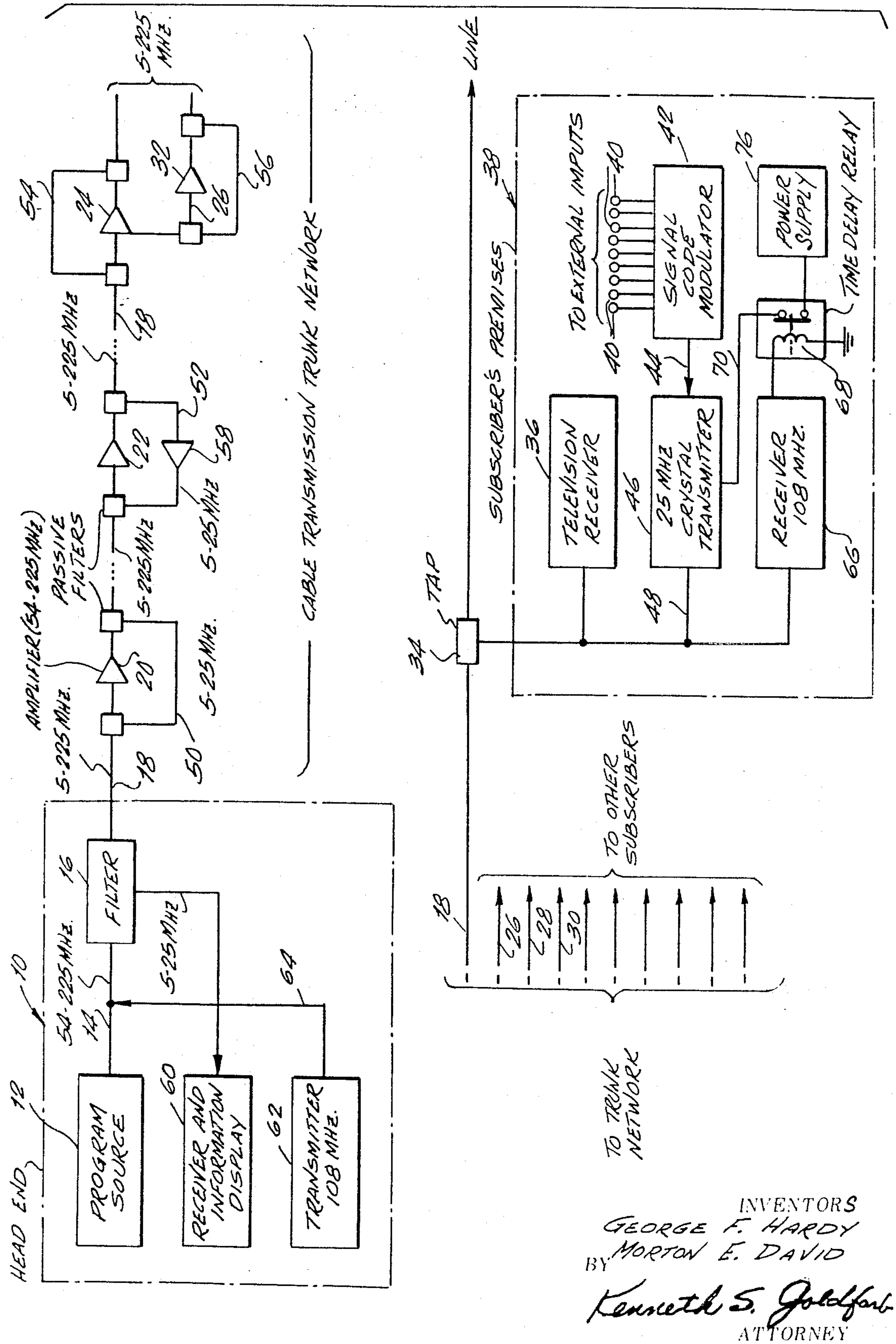
INVENTORS
GEORGE F. HARDY
MORTON E. DAVID
BY Kenneth S. Goldfarb
ATTORNEY

ALARM SYSTEM

This is a continuation of application, Ser. No. 863,563 filed Oct. 3, 1969.

This invention relates to an alarm system for use in combination with a community antenna television system (CATV) for the transmission of a fire, and intrusion, and other emergency alarm from the premises of a community antenna television subscriber to the head or central office of the community antenna television system operator.

The concept of this invention features the employment of existing community antenna television system cable facilities to expand the availability of existing security services to the residential subscribers of the community antenna television system.

It is an object of the present invention to eliminate the need to string or lay a direct wire from the protected premises to a central receiving station as is necessary with existing types of security services.

It is a further object of the invention to provide means for eliminating the excessive cost involved in the labor of stringing or laying additional wire for a security system, which usually exceeds the cost of the wire itself.

It is a further object of the present invention to provide means for differentiating a signal being sent from the premises of the subscriber to the central office from the television signal from the program source.

It is a further object of the present invention to provide an arrangement of passive filters which may optionally include amplifiers for by-passing the amplifiers provided on the transmission lines.

It is yet another object of the invention to provide means for transmitting a signal to turn off all other alarm transmitting units while receiving a signal from one unit, while also providing means for testing the continuity of the community antenna television system itself.

Still further objects and features of this invention reside in the provision of an alarm system which is easy to install in conjunction with an existing community antenna television system, efficient in use, which will indicate that the subscriber's unit is functioning properly and that the lines forming the path back to the central office are in operating condition.

These, together with the various ancillary objects and features of this invention, which will become apparent as the following description proceeds, are attained by this alarm system, a preferred embodiment of which is illustrated in the accompanying drawing, by way of example only, wherein:

The FIG. is a block diagram for an alarm system for use in conjunction with an existing community antenna television system in accordance with the concepts of the present invention.

With continuing reference to the accompanying drawing, reference numeral 10 generally designates the head end or central office of a community antenna television system as modified by the incorporation therein of an alarm system in accordance with the concepts of the present invention. A program source 12 is provided which transmits at a frequency ranging between 54 and 225 megahertz a television program to be selected by the subscriber. While the normal video signal transmitted by community antenna television stations are found in the band in the order of 54 and 225 MHZ, there are several unused segments, one of which is between 108 114 MHZ. Further, by using passive filters it is possible to distinguish between signals above 50 MHZ and signals below 50 MHZ. The signal from the program source is transmitted through line 14 to a filter 16 and then poasses over line 18 adapted to carry signals between 5 to 225 MHZ. It is usually necessary to amplify the signal being sent to the subscriber and amplifiers 20, 22, 24, etc. are provided for amplifying the signal from the program source. Of course, connected to the trunk network of line 18 are additional lines 26, 28, 30, etc., each of which may be provided with suitable amplifiers as at 32 for amplification of the signal from the program source. Each of the lines 18, 26, 28, 30, etc. may have suitable taps 34 therein to which a television receiver 36 at the subscriber's premises, generally indicated at 38, may be connected.

In accordance with the concepts of the present invention, a plurality of conventional detecting units are connected to terminals 40 which in turn are connected to a signal code modulator 42. The signal code modulator provides an identifiable signal coded to the type of disturbance or emergency condition detected, such as fire, burglar, intrusion, or the like, and the output of the signal code modulator in the form of a coded signal is directed through connection means 44 to transmitting means 46 preferably in the form of a crystal transmitter adapted to be critically tuned to transmit the coded signal over a predetermined frequency, as for example, 25 MHZ. The crystal transmitter is connected through line 48 through the tap 34 and transmits back over the line 18 the coded signal. For each of the amplifiers 20, 22, 24, 32, there is provided a passive by-pass netowrk 50, 52, 54, 56, etc. It is likely to be necessary to amplify the coded signal being sent by the subscriber's transmitter 46 just as it is necessary for the video signal to be amplified, and at selected locations of the by-pass network 50, 52, 54, 56, etc. suitable amplifers such as indicated at 58 are provided. The coded signal from the transmitting means 46 is sent back through the filter 16 and thence to a receiver 60 which according to present technology the signal would be suitably displayed.

Further, in accordance with the concept of the invention, is the utilization of means for enabling the transmission of a signal to check out a specific subscriber unit. In carrying out this practice a transmitter 62 in the central office 10 is connected through conductor 64 to the line 14 and transmits at a frequency of 108 MHZ. This check signal is received at receiver 66 at the subscriber's premises 38 for actuating a relay 68 which keys a signal after a predetermined time delay through conductor 70 to the transmitting means 46 and thence back to the receiver 60. By this arrangement it is possible to supervise the system and enables the central office 10 to see whether a signal arrives at the subscriber's premises 38 by receiving back a signal confirming that the signal got there and that the subscriber's unit is functioning properly as well as that the signal lines back to the central office are in operating condition.

The present invention functions to provide fire, intrusion, and emergency alarm service to any of the customers of the community antenna television system. The customer is provided with a unit including the modulator 42, the crystal transmitter 46, the receiver 66, and the time delay relay 68 and associates lines which are directly attached to the antenna leads which go to the subscriber's premises 38. The crystal transmitter transmits a signal from the signal code modulator which is preferably of a three-unit code (3x3) or the like. Such a code can be a tone code such as found in the touch tone type telephone and the first two tones may be used to identify the subscriber's premises, while the third tone could signal the specific nature of the emergency. The modulated signal is sent back along the line 18 or the like of the community antenna television system where it can be received at the central office, demodulated and appropriately displayed over the receiver 60 so that the community antenna television system operator on duty knows that a particular subscriber's premises was transmitting a fire alarm. The operator can then look up the address of the subscriber and telephone the appropriate fire department. When the central office is receiving a signal from a subscriber, the central office may add to the video signal a signal through transmitter 62 which will operate the relay 68 which will prevent any other subscriber from transmitting by cutting off the power source 76 for a predetermined period of time. The turning back on of the transmitter 46 through operation of the time delay relay of each of the subscriber's premises can be staggered so that there will be no immediate transmission by more than one transmitter to prevent the garbling of a transmitter sending forth the alarm. By using the three-tone matrix in a three-by-three manner as theretofore suggested, there can be up to eighty-one subscribers on a single frequency and it is, of course, possible to expand the number of subscribers' identification pulses, but to do so would increase the likelihood of simultaneous transmissions. Additional subscribers can be easily accommodated by using a different carrier frequency. For example, one carrier frequency can be 25 MHZ while another frequency can be 24.95 MHZ using a crystal control transmitter so that the frequencies are kept completely separate.

A latitude of modification, change and substitution is intended in the foregoing disclosure, and in some instances some features of the invention will be employed without a corresponding use of other features.

We claim:

1. An alarm system for use with a transmission system of the type including a central office having a program source of information, transmitting means at said central office for converting said information into electric signals, at least two receiving stations, a receiver at each of said receiving stations for receiving said electric signals and for converting said signals to said information, and transmission paths interconnecting said central office and said receiving stations for the transmission of said electric signals therebetween; said alarm system comprising an alarm transmitter at each of said receiving stations for transmitting an alarm signal via said transmission paths to said central office in response to an alarm condition at said receiving station, an alarm signal receiving device at said central office responsive to an alarm signal for indicating the reception of said alarm signal and the receiving station originating said alarm signal, each of said alarm transmitters including supervisory means responsive to the reception of a key signal for transmitting a supervisory signal indicating the associated alarm transmitter is operating properly to said alarm receiving device via said transmission paths, each of said supervisory means including control means for transmitting said supervisory signals from each of said alarm transmitters in a different position in a signal property demain, and a key signal generator at said central office for generating said key signal.

2. An alarm system as in claim 1, in which said control means includes timing means and said signal property domain comprises the time domain whereby said supervisory signals are transmitted at different times.

3. An alarm system as in claim 2, in which said timing means comprises a time delay relay, each time delay relay at each of said receiving stations having a different interval of operation whereby each alarm transmitter is energized in a preselected sequence after the reception of said key signal.

4. An alarm system as in claim 3, in which said transmission paths comprise one-way amplifiers for amplifying the signal transmitted from said central office to said receiving station, and by-pass means around each of said one-way amplifiers for providing a path for the transmission of signals from said receiving stations to said central office.

5. An alarm system as in claim 2, in which each of said alarm transmitters comprises an alarm signal generator for generating an alarm signal, indicative of a particular alarm condition, and a plurality of alarm sensors connected to said alarm signal generator, each one of said plurality of alarm sensors being operable to sense a different alarm condition and cause said alarm signal generator to generate an alarm signal indicating the sensed alarm condition.

6. An alarn system as in claim 5, in which said alarm signal generator includes identifying means for generating an address signal for identifying the receiving station transmitting the alarm signal.

7. In combination, an alarm and signal transmission system comprising a central office and a plurality of receiving stations interconnected by transmission paths for the transmission of energy therebetween a program source of information at said central office, program transmitting means at said central office for transmitting said information to said plurality of recieving stations via said transmission paths, receiving means at each of said receiving stations for receiving said information from said central office, an alarm signal generator at each one of said plurality of receiving stations for generating an alarm signal indicating an alarm condition and a supervisory signal indicating an operating condition and for transmitting said signals to said central office via said transmission paths, at least one alarm sensor at each one of said plurality of receiving stations for causing said alarm signal generator to generate and transmit the alarm signal, an alarm signal receiver at said central office for indicating the reception of an alarm signal, control means at each one of said plurality receiving stations operable in response to a key signal for causing said alarm signal generators to generate and transmit said supervisory signals in a preselected sequence, and a selectively operable key signal generator at said central office for generating said key signal.

8. A transmission system as in claim 7, in which said alarm signal generator comprises encoding means for encoding a receiver identifying signal as part of said transmitted signals, and said alarm signal receiver comprises decoding means for decoding said receiver identifying signal to indicate the receiver transmitting the received signals.

9. A transmission system as in claim 7, in which said control means comprises a receiver for detecting said key signal, and a time delay relay connected to said receiver and being operable by said receiver in response to the detection of said key signal, and wherein the time delay relays at each one of said plurality of receiving stations has a different interval of operation.

10. A transmission system as in claim 7, in which a plurality of alarm sensors are provided at each one of said plurality of receiving stations for sensing different alarm conditions, and for causing said alarm signal generator to generate and transmit an alarm signal indicative of the sensed alarm condition.

* * * * *